US008304925B2

(12) United States Patent　　(10) Patent No.: US 8,304,925 B2
Yang et al.　　(45) Date of Patent: Nov. 6, 2012

(54) MOVABLE OBJECT TYPE HIGH-EFFICIENCY WAVE ENERGY APPARATUS

(75) Inventors: Dong-soon Yang, Daejeon (KR); Byung-hak Cho, Daejeon (KR); Yong-kwan Lee, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 452 days.

(21) Appl. No.: 12/616,126

(22) Filed: Nov. 10, 2009

(65) Prior Publication Data

US 2011/0031751 A1　Feb. 10, 2011

(30) Foreign Application Priority Data

Aug. 7, 2009　(KR) .................. 10-2009-0072895

(51) Int. Cl.
　　*F03B 13/10*　　(2006.01)
　　*F03B 13/12*　　(2006.01)
　　*H02P 9/04*　　(2006.01)
(52) U.S. Cl. ........................................... 290/42; 290/53
(58) Field of Classification Search .................... 290/42, 290/53
See application file for complete search history.

(56) References Cited

U.S. PATENT DOCUMENTS

| | | | | |
|---|---|---|---|---|
| 882,883 | A * | 3/1908 | Hillson | 60/500 |
| 917,411 | A * | 4/1909 | Oasella et al. | 60/500 |
| 1,078,323 | A * | 11/1913 | Trull | 417/332 |
| 1,408,094 | A * | 2/1922 | Kersey | 60/500 |
| 3,477,233 | A * | 11/1969 | Andersen | 405/79 |
| 3,758,788 | A * | 9/1973 | Richeson | 290/42 |
| 3,961,863 | A * | 6/1976 | Hooper, III | 417/334 |
| 4,077,213 | A * | 3/1978 | Hagen | 60/500 |
| 4,098,084 | A * | 7/1978 | Cockerell | 60/500 |
| 4,118,932 | A * | 10/1978 | Sivill | 60/500 |
| 4,210,821 | A * | 7/1980 | Cockerell | 290/53 |
| 4,282,712 | A * | 8/1981 | Comyns-Carr et al. | 60/500 |
| 4,289,455 | A * | 9/1981 | Comyns-Carr et al. | 417/332 |
| 4,316,704 | A * | 2/1982 | Heidt | 417/100 |
| RE31,111 | E * | 12/1982 | Hagen | 60/500 |
| 4,392,349 | A * | 7/1983 | Hagen | 60/500 |
| 4,408,454 | A * | 10/1983 | Hagen et al. | 60/500 |
| 4,552,514 | A * | 11/1985 | Hagen | 417/332 |
| 4,684,815 | A * | 8/1987 | Gargos | 290/53 |
| 4,686,377 | A * | 8/1987 | Gargos | 290/53 |
| 4,792,290 | A * | 12/1988 | Berg | 417/332 |
| 5,132,550 | A * | 7/1992 | McCabe | 290/53 |
| 5,986,349 | A * | 11/1999 | Eberle | 290/53 |
| 6,173,922 | B1 * | 1/2001 | Hoyt et al. | 244/158.2 |

(Continued)

FOREIGN PATENT DOCUMENTS

JP　　51-34343　　3/1976

(Continued)

OTHER PUBLICATIONS

British Search and Examination Report issued in British Patent Application No. GB0917113.3 dated Jan. 12, 2010.

(Continued)

*Primary Examiner* — Pedro J Cuevas
(74) *Attorney, Agent, or Firm* — McDermott Will & Emery LLP

(57) ABSTRACT

Disclosed is a movable object type high-efficiency wave energy apparatus which further accelerates vibration of floating bodies according to vibration of waves to maximize electric power generation efficiency.

14 Claims, 9 Drawing Sheets

U.S. PATENT DOCUMENTS

| | | | | |
|---|---|---|---|---|
| 6,260,807 | B1* | 7/2001 | Hoyt et al. | 244/158.2 |
| 6,286,788 | B1* | 9/2001 | Hoyt et al. | 244/158.2 |
| 6,290,186 | B1* | 9/2001 | Hoyt et al. | 244/158.2 |
| 6,386,484 | B1* | 5/2002 | Hoyt et al. | 244/158.2 |
| 6,431,497 | B1* | 8/2002 | Hoyt et al. | 244/158.2 |
| 6,476,511 | B1* | 11/2002 | Yemm et al. | 290/42 |
| 7,315,092 | B2* | 1/2008 | Cook | 290/53 |
| 7,443,045 | B2* | 10/2008 | Yemm | 290/42 |
| 7,737,698 | B2* | 6/2010 | Tenghamn et al. | 324/347 |
| 8,008,792 | B2* | 8/2011 | Gray | 290/42 |
| 2006/0208494 | A1* | 9/2006 | Cook | 290/53 |
| 2007/0200353 | A1 | 8/2007 | Ottersen | 290/53 |
| 2008/0122225 | A1* | 5/2008 | Smith | 290/42 |
| 2009/0152391 | A1* | 6/2009 | McWhirk | 244/30 |
| 2010/0026000 | A1* | 2/2010 | Hogmoe | 290/53 |
| 2010/0038913 | A1* | 2/2010 | Svelund | 290/53 |
| 2010/0310376 | A1* | 12/2010 | Houvener et al. | 416/146 R |
| 2011/0304144 | A1* | 12/2011 | Dehlsen et al. | 290/53 |
| 2012/0087732 | A1* | 4/2012 | Gray | 405/76 |
| 2012/0102938 | A1* | 5/2012 | Burns et al. | 60/499 |
| 2012/0153619 | A1* | 6/2012 | Chan | 290/52 |
| 2012/0153627 | A1* | 6/2012 | Jo | 290/53 |

FOREIGN PATENT DOCUMENTS

| | | |
|---|---|---|
| KR | 20-0326768 | 9/2003 |
| KR | 10-2005-0065475 | 6/2005 |
| WO | WO 00/17519 | 3/2000 |
| WO | WO 01/96737 | 12/2001 |
| WO | WO 2008/121646 | 10/2008 |
| WO | WO 2008/135046 | 11/2008 |

OTHER PUBLICATIONS

United Kingdom Notice of Grant issued in UK Patent Application No. GB0917113.3 dated Oct. 25, 2012.

Korean Notice of Allowance, and English translation thereof, issued in Korean Patent Application No. 10-2009-0072895 dated Mar. 23, 2012.

* cited by examiner (A)

(B)

① First control method 1 : Po=1, 0bar,    ② First control method 1 : Po=1, 5bar,
③ Second control method 1 : Zs0=0.3m,    ④ Second control method 1 : Zs0=0.6m

MOVABLE OBJECT TYPE HIGH-EFFICIENCY WAVE ENERGY APPARATUS

BACKGROUND OF THE INVENTION

1. Field of the Invention

The present invention relates to a movable object type wave energy apparatus having a plurality of floating bodies, and more particularly to a movable object type high-efficiency wave energy apparatus which further accelerates vibration of floating bodies according to vibration of waves to maximize electric power generation efficiency.

2. Description of the Related Art

Generally, a conventional wave energy apparatus is of a floating surface following type, wherein electric power is produced according to upward and downward movement of waves, with the result that the energy conversion efficiency is merely approximately 10%, which is very low. Also, the conventional wave energy apparatus has a defective measuring technology, with the result that it is very difficult to maintain safety of equipment in a windstorm or in abnormal weather.

SUMMARY OF THE INVENTION

Therefore, the present invention has been made in view of the above problems, and it is an object of the present invention to provide a movable object type high-efficiency wave energy apparatus that is capable of accelerating upward and downward movement of floating bodies according to vibration of waves to convert kinetic energy obtained by amplifying the vibration into electric energy, preventing the deterioration in safety of the floating bodies which may be caused in a windstorm or in abnormal weather, eliminating the necessity of a mooring device to repair equipment, preventing the movement of the floating bodies, and transmitting electricity generated by the floating bodies through a submarine cable.

In accordance with the present disclosure, the above and other objects can be accomplished by the provision of a movable object type high-efficiency wave energy apparatus including floating bodies floating on a sea surface to convert upward and downward movement of waves generated by wind into electric energy. One of the floating bodies and a neighboring one of the floating bodies are connected to each other via a coupler. The coupler includes left and right bodies, a horizontal rotary shaft and a vertical rotary shaft connected to each other via a middle hinge shaft to connect the left and right bodies to each other, ram connection units to connect accumulators mounted to the left and right bodies to the horizontal and vertical rotary shafts, and electric power converters having electric generators connected to the accumulators, connected to the respective ram connection units, via coolers mounted therein for cooling an oil, the electric generators of the electric power converters disposed at the left and right bodies are connected to a concrete dock installed on the sea floor via a VECTRAN® wire, and a submarine cable connected to the VECTRAN® wire through the concrete dock supplies electricity to land via a power station and a power line.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a preferred embodiment of the present invention will be described in detail with reference to the accompanying drawings.

Figure 1:
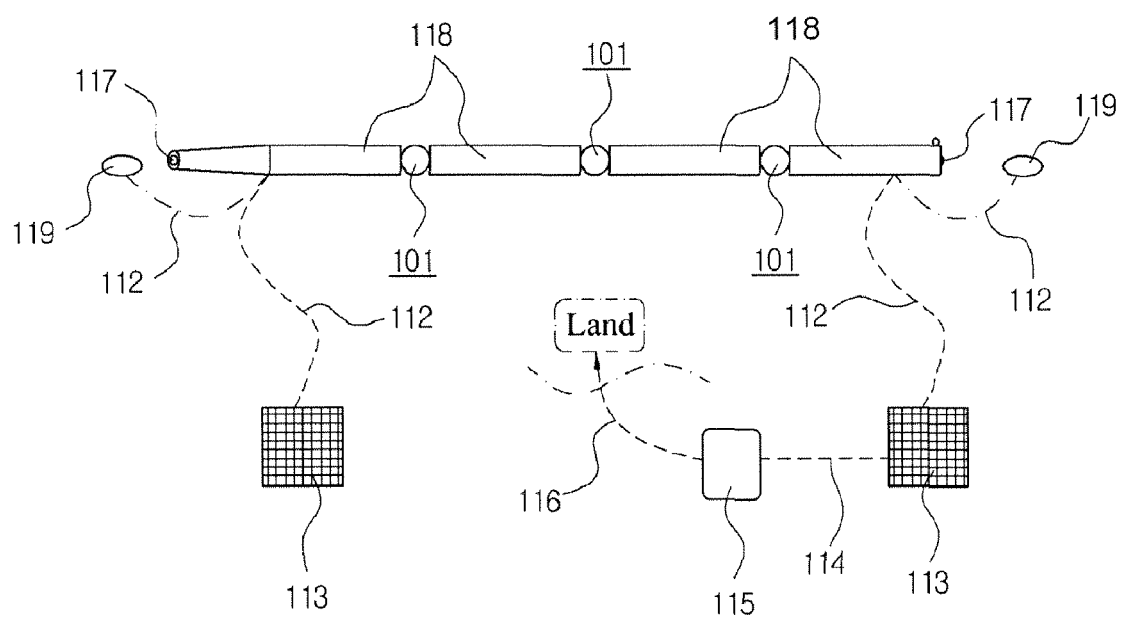
FIG. 1 is an overall construction view schematically illustrating a movable object type high-efficiency wave energy apparatus according to the present invention.
Figure 2:
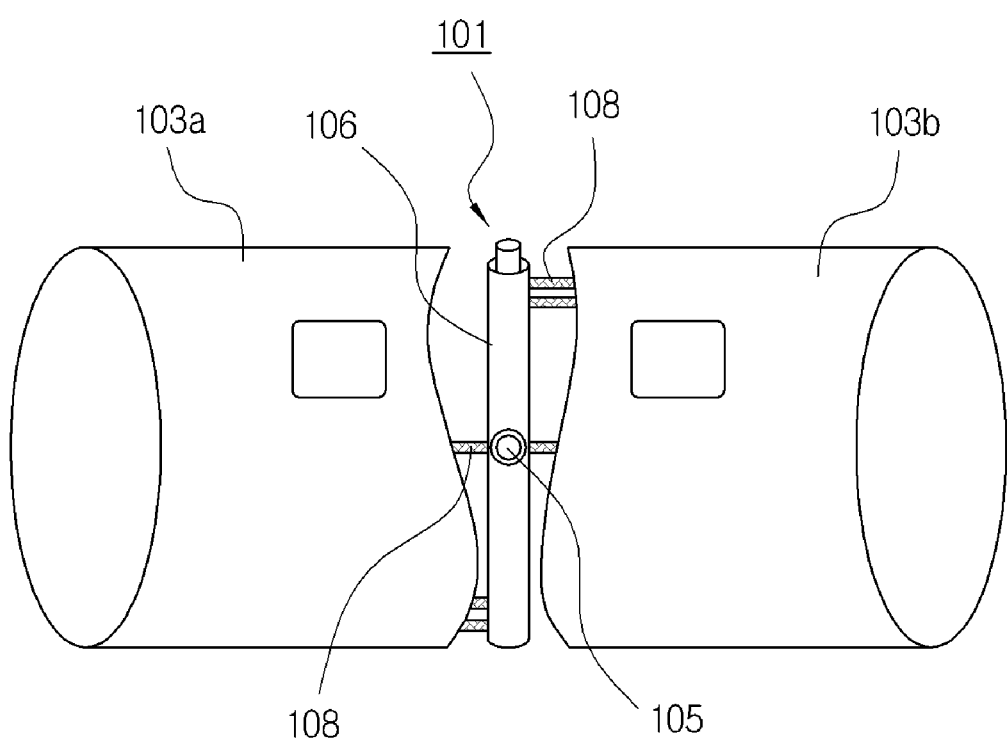
FIG. 2 is an external view of a coupler to interconnect floating bodies according to the present invention.
Figure 3:
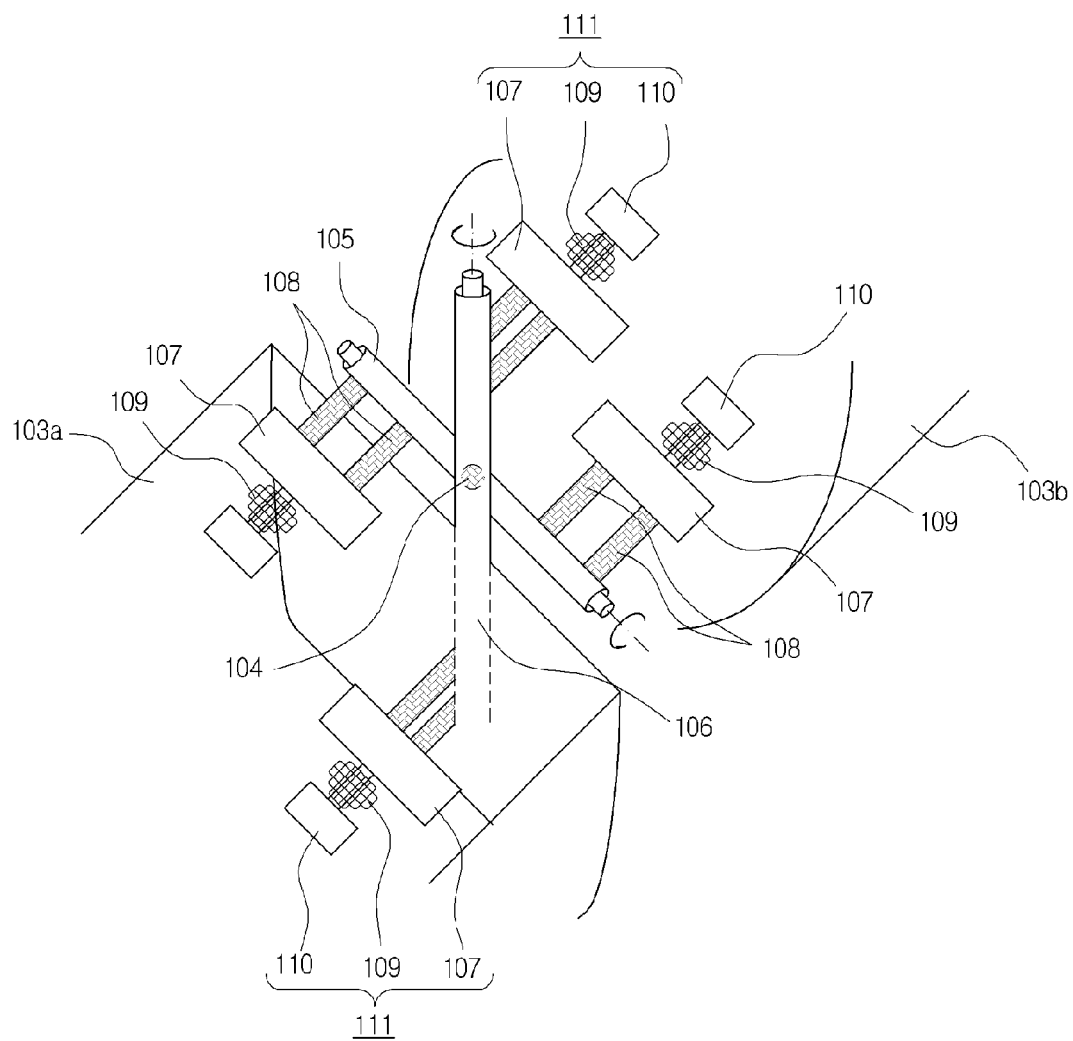
FIG. 3 is an enlarged view, partially cutaway, of FIG. 2.
Figure 4:
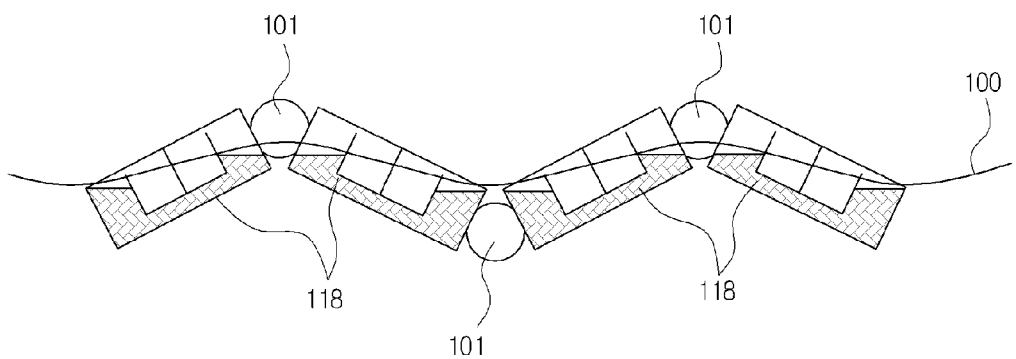
FIG. 4 is a view illustrating the floating bodies according to the present invention installed at a sea surface in a state in which the floating bodies are connected to one another via the corresponding couplers.

FIG. 1 is an overall construction view schematically illustrating a movable object type high-efficiency wave energy apparatus according to the present invention, FIG. 2 is an external view of a coupler to interconnect floating bodies according to the present invention, and FIG. 3 is an enlarged view, partially cutaway, of FIG. 2.

The movable object type wave energy apparatus according to the present disclosure includes floating bodies 118 floating on a sea surface 100 to convert upward and downward movement of waves generated by wind into electric energy. One of the floating bodies 118 and a neighboring one of the floating bodies 118 are connected to each other via a coupler 101. The coupler 101 includes left and right bodies 103a and 103b, a horizontal rotary shaft 105 and a vertical rotary shaft 106 connected to each other via a middle hinge shaft 104 to connect the left and right bodies 103a and 103b to each other, ram connection units 108 to connect accumulators 107 mounted to the left and right bodies 103a and 103b to the horizontal and vertical rotary shafts 105 and 106, and electric power converters 111 having electric generators 110 connected to the accumulators 107, connected to the respective ram connection units 108, via coolers 109 mounted therein for cooling an oil. The electric generators 110 of the electric power converters 111 disposed at the left and right bodies 103a and 103b are connected to a concrete dock 113 installed on the sea floor via a VECTRAN® wire 112. A submarine cable 114 connected to the VECTRAN® wire 112 through the concrete dock 113 supplies electricity to land via a power station 115 and a power line 116.

Each of the floating bodies 118 is formed in the shape of a hollow cylinder. The front of each of the floating bodies 118 is formed in a streamline shape to minimize friction with waves. A connection ring 117 to convey each of the floating bodies 118 is provided at the front end of each of the floating bodies 118.

In each of the electric power converters 111, disposed in the left and right bodies 103a and 103b of the coupler 101, the ram connection unit 108 is connected to the corresponding accumulator 107 to convert rotational movement of the horizontal and vertical rotary shafts 105 and 106 rotating in the transverse direction and in the longitudinal direction of each of the floating bodies 118, respectively, into rectilinear movement. The ram connection unit 108 includes a plurality of rams.

The accumulator 107 connected to the ram connection unit 108 is configured to store operating oil compressed by the ram connection unit 108. The electric generator 110 is connected to the accumulator 107 to convert the compressed oil, stored in the accumulator 107, into electric power.

A generally known connection member for electric power transmission to transmit the electric power generated by the electric generator 110 is connected to the VECTRAN® wire 112. In the VECTRAN® wire 112 is installed a power transmission line, which is connected to the submarine cable 114. The VECTRAN® wire 112 is formed of synthetic fiber which readily floats in water and is strong, and therefore, the VECTRAN® wire 112 may also be used to prevent the movement of the floating bodies 118.

Also, a buoy 119 is connected to one end of the VECTRAN® wire 112, having the corresponding floating body 118 connected to the other end thereof, such that the buoy 119 floats on a sea surface.

Meanwhile, the floating movable object type high-efficiency wave energy apparatus according to the present invention further includes a generally known remote monitor and a controller to control the remote monitor. The remote monitor and the controller are configured to communicate with an integrated monitoring and operation room via an electric power communication line. Also, a satellite navigation system may be installed to acquire location information.

Figure 5:
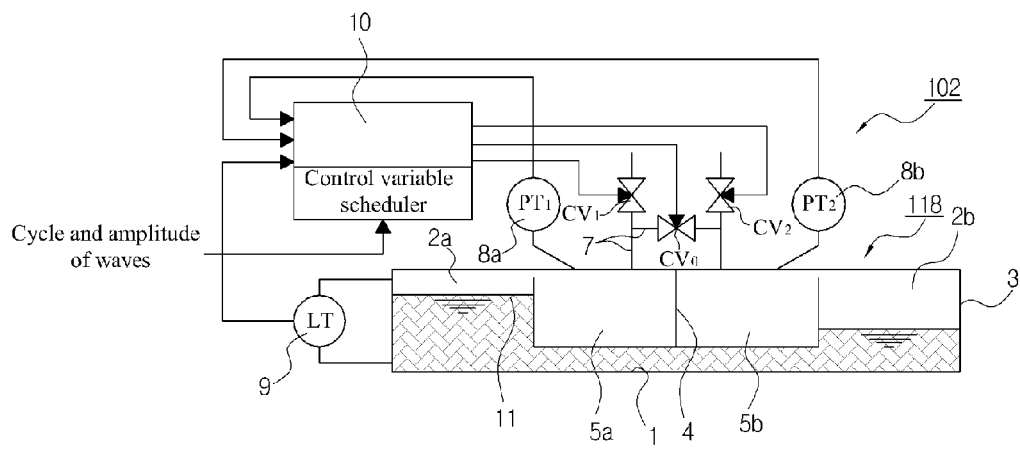
FIG. 5 is an overall construction view illustrating one of the floating bodies according to the present invention.

FIG. 5 is an overall construction view illustrating one of the floating bodies 118 according to the present invention, FIG. 6(A) is an enlarged view illustrating the floating body of FIG. 5 in a level state, FIG. 6(B) is an enlarged view illustrating the floating body of FIG. 5 in an inclined state in which the floating body is inclined at a predetermined angle, and FIGS. 7 to 10 are graphs related to the floating body of FIG. 5.

A variable liquid column oscillator 102, to which each of the floating bodies 118 according to the present invention is applied, includes: a floating body 118 having a U-shaped tube 3 including a horizontal tube 1 and vertical tubes 2a and 2b communicating with each other through the horizontal tube 1, and air chambers 5a and 5b connected to the vertical tubes 2a and 2b, the air chambers 5a and 5b being isolated from each other about an isolation plate 4; an air tube 7 to connect the air chambers 5a and 5b to each other; three control valves $CV_1$, $CV_0$ and $CV_2$ mounted on the air tube 7; pressure transformers 8a and 8b connected to the air chambers 5a and 5b, respectively, and a level transformer 9 connected to the vertical tube 2a; and a controller 10 to which the control valves $CV_1$, $CV_0$ and $CV_2$, the pressure transformers 8a and 8b, and the level transformer 9 are connected.

When the floating body 118 is at the sea surface 100 in a level state, i.e., in an equilibrium state, as shown in FIG. 6(A), the controller 10 controls air pressures Po of the air chambers 5a and 5b based on the amplitude and cycle of waves to improve energy absorption efficiency. On the other hand, when the floating body 118 is at the sea surface 100 in an inclined state, as shown in FIG. 6(B), the controller 10 controls the control valves $CV_1$, $CV_0$ and $CV_2$ disposed between the air chamber 5a and the air chamber 5b to be opened and closed at a specific reference level Zs of internal operating liquid 11 contained in the U-shaped tube 3 based on the amplitude and cycle of waves to improve energy absorption efficiency.

Also, when frozen waves are generated, the controller 10 controls air pressures Po of the air chambers 5a and 5b such that the variable liquid column oscillator 102 applied to the present invention is operated in a tuned liquid column damper region to reduce excessive load applied from the frozen waves.

Meanwhile, a predetermined amount of the internal operating liquid 11 is contained in the U-shaped tube 3. Water or seawater may be used as the internal operating liquid.

Hereinafter, a control method of vibrating the floating body 118 with the above-stated construction, such that the floating body 118 is tuned to the cycle of waves, will be described in detail.

The control method includes a first control method of controlling air pressures Po of the air chambers 5a and 5b in an equilibrium state using the control valve $CV_1$ $CV_2$ of the air chambers 5a and 5b in a state in which the center control valve $CV_0$ of FIG. 5 is closed and a second control method of nonlinearly controlling pressures of the air chambers 5a and 5b using the center control valve $CV_0$ in a state in which the control valves $CV_1$ and $CV_2$ of the air chambers 5a and 5b are closed.

Both of the control methods are used to induce spring effects caused by compression and expansion of air to control a natural vibration cycle of the variable liquid column oscillator applied to the present invention.

First, a spring constant of an air spring according to the first control method is linearly proportional to air pressures Po of the air chambers 5a and 5b in an equilibrium state, on the assumption that an amount of air volume changed by the fluctuation in level of the internal operating liquid 11 is sufficiently small as compared with the volumes of the air chambers 5a and 5b.

When the air chambers 5a and 5b are under total vacuum, therefore, the spring constant is 0. With the increase in pressure of the air chambers 5a and 5b, the spring constant increases.

As a result, the air pressures Po of the air chambers 5a and 5b may be controlled by the control valves $CV_1$ and $CV_2$ connected to the air chambers 5a and 5b, respectively, without the provision of additional compression or vacuum pumps.

For example, when pressures of the air chambers 5a and 5b exceed atmospheric pressure due to the internal operating liquid 11 of the floating body 118, the control valves $CV_1$ and $CV_2$ are opened to discharge a predetermined amount of air to the atmosphere, with the result that air pressures Po of the air chambers 5a and 5b are kept below atmospheric pressure. On the other hand, when pressures of the air chambers 5a and 5b are lower than atmospheric pressure, the control valves $CV_1$ and $CV_2$ are opened to suction air from the atmosphere, with the result that air pressures Po of the air chambers 5a and 5b are kept above atmospheric pressure.

In the second control method, the center control valve $CV_0$ is opened and closed only under a specific condition based on the level of the internal operating liquid 11 to achieve air spring effects.

In the second control method, when the level of the internal operating liquid 11 contained in the vertical tubes 2a and 2b is higher or lower than a predetermined specific reference level Zs, the center control valve $CV_0$ is rapidly closed to compress or expand air in the air chambers 5a and 5b by inertia force of the internal operating liquid 11, thereby achieving air spring effects.

For example, when all of the control valves $CV_1$, $CV_0$ and $CV_2$ are closed in a state in which the floating body 118 is inclined at a predetermined angle by waves of seawater, as shown in FIG. 6(B), the internal operating liquid 11 contained in the vertical tube 2a compresses the air in the air chamber 5a, whereas the internal operating liquid 11 contained in the vertical tube 2b expands the air in the air chamber 5b, thereby generating force to restore the level of the internal operating liquid 11 to a level before the center control valve $CV_0$ is closed.

In a region in which the level of the internal operating liquid 11 does not exceed a range of the predetermined specific reference level Zs, however, the center control valve $CV_0$ is opened, and therefore, no air spring effects are induced. As a result, the internal operating liquid 11 freely moves in the U-shaped tube 3 without restriction.

Figure 7:
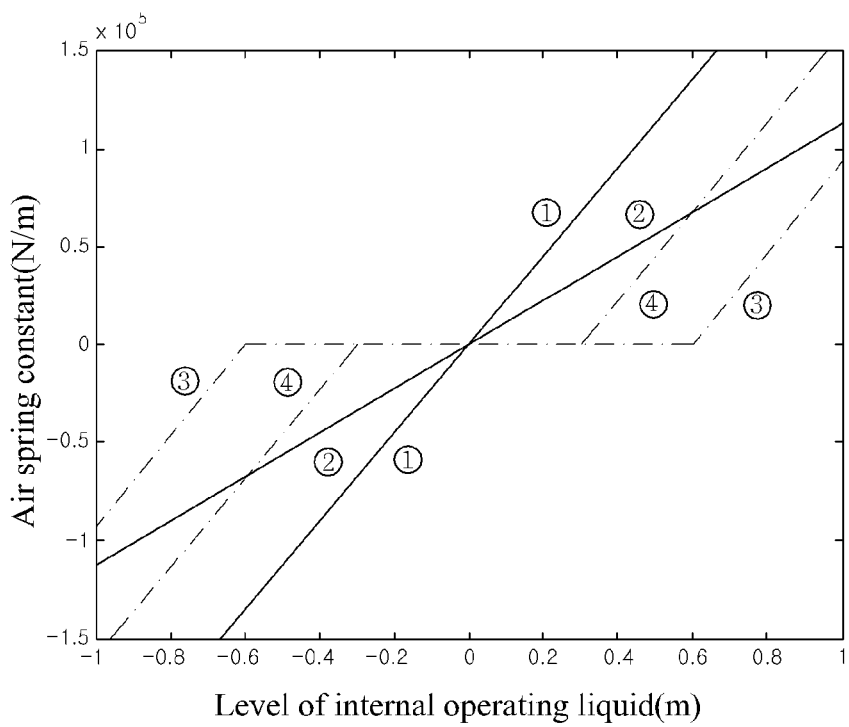
FIGS. 7 to 10 are graphs related to the floating body of FIG. 5.

Examples of the air springs derived from the first and second control methods are shown in FIG. 7, which illustrates the relationship between the air spring constants and the level of the internal operating liquid.

Figure 8:
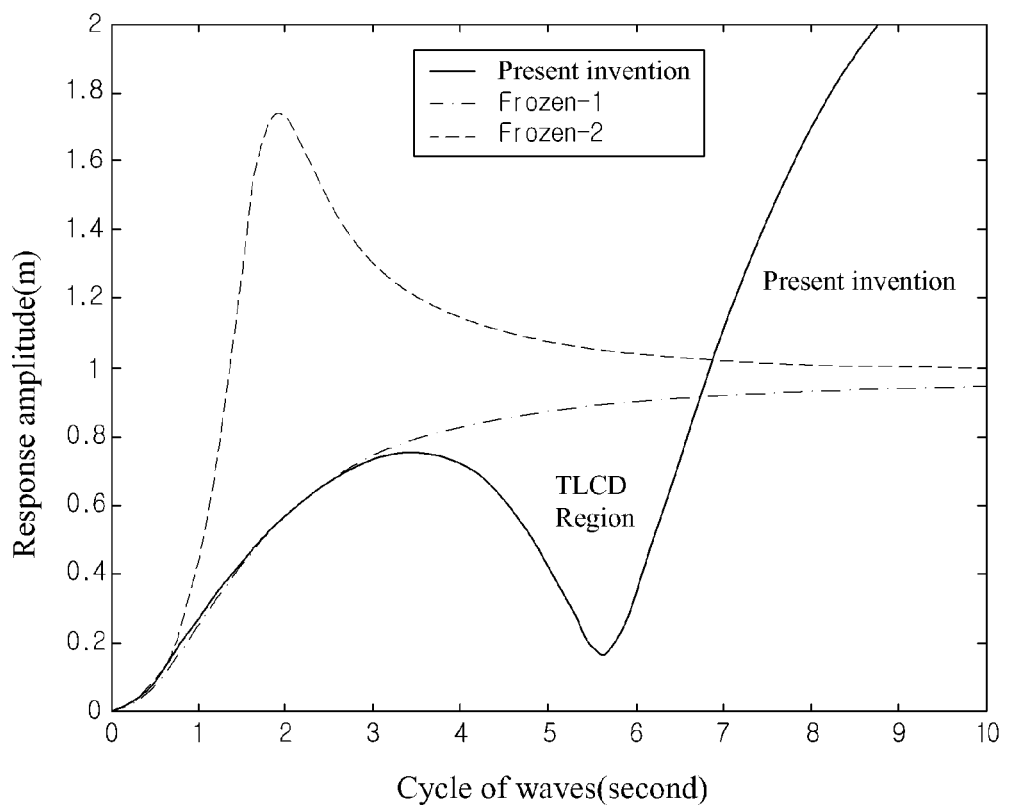

Meanwhile, FIG. 8 is a graph illustrating general open loop frequency response characteristics of the floating body 118 according to the present invention and a conventional movable object type wave energy apparatus.

In FIG. 8, a state of frozen waves means a state in which the movement of the internal operating liquid 11 is forcibly restricted.

In the graph of FIG. 8, responses of the present invention and Frozen-1 are results obtained by equalizing the coefficients of viscous friction for energy absorption.

Figure 6:
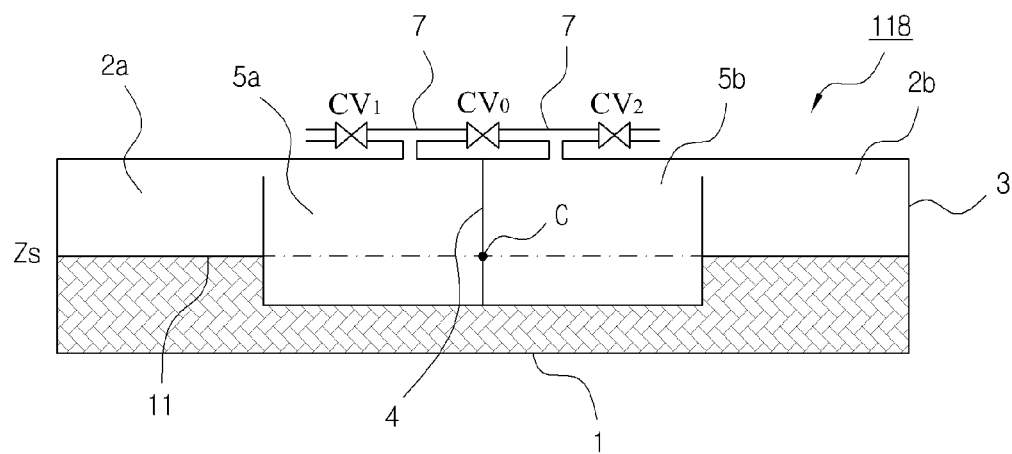
FIG. 6(A) is an enlarged view illustrating the floating body of FIG. 5 in a level state.
FIG. 6(B) is an enlarged view illustrating the floating body of FIG. 5 in an inclined state in which the floating body is inclined at a predetermined angle.
Figure 6:
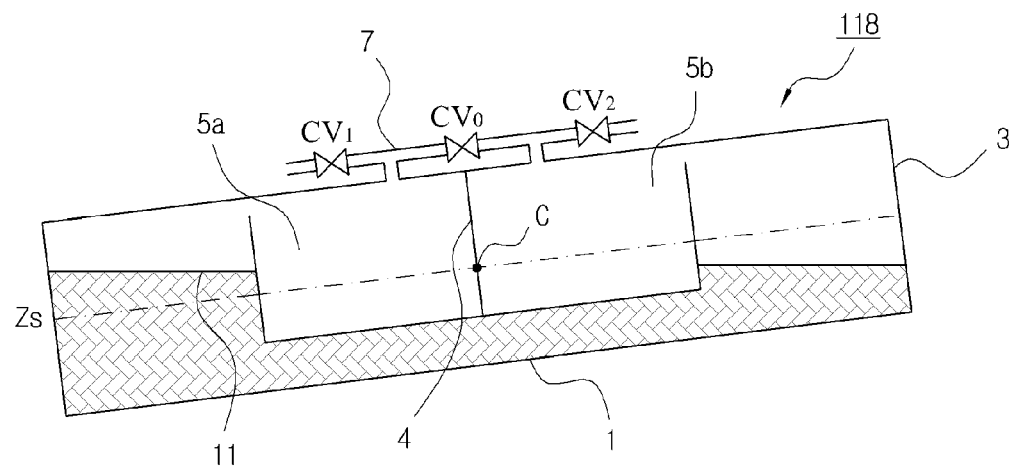

The coefficient of viscous friction for energy absorption is generated by an electric generator installed at the rotation center C of the floating body 118, as shown in FIG. 6, to convert rotational energy into electric power.

It can be seen that, when a cycle of waves is between approximately 4 seconds and approximately 7 seconds, the response of the present invention is much less than the response of Frozen-1. The region in which the response of the present invention is much less than the response of Frozen-1 is a tuned liquid column damper (TLCD) region. However, it can be seen that, when a cycle of waves exceeds approximately 7 seconds, the response of the present invention is much greater than the response of Frozen-1. The region in which the response of the present invention is much greater than the response of Frozen-1 is applied to the present invention.

A cycle of waves generally generated in the ocean is between approximately 4 seconds and approximately 9 seconds. On the other hand, the open loop frequency response of the present invention includes the TLCD region existing between approximately 4 seconds and approximately 7 seconds. Therefore, it is necessary to avoid the TLCD region.

To this end, it is necessary to perform control including the above-mentioned air spring effects. As a result, a resonance cycle of the TLCD region is reduced to less than 4 seconds, and therefore, the response in a region having an effective cycle of waves is greater than the response of Frozen-1 shown in the graph of FIG. 8.

Also, Frozen-2, shown in the graph of FIG. 8, is a response obtained when the coefficient of viscous friction for energy absorption is less than that of Frozen-1. It can be seen that a resonance cycle of the present invention is approximately 1.9 seconds in a state of frozen waves. On the other hand, a resonance cycle of the conventional apparatus is approximately 1.9 seconds in a state of frozen waves, which is considerably different from the effective cycle of waves, i.e., approximately 4 seconds to approximately 9 seconds. As a result, it is not possible to efficiently absorb energy.

Figure 9:
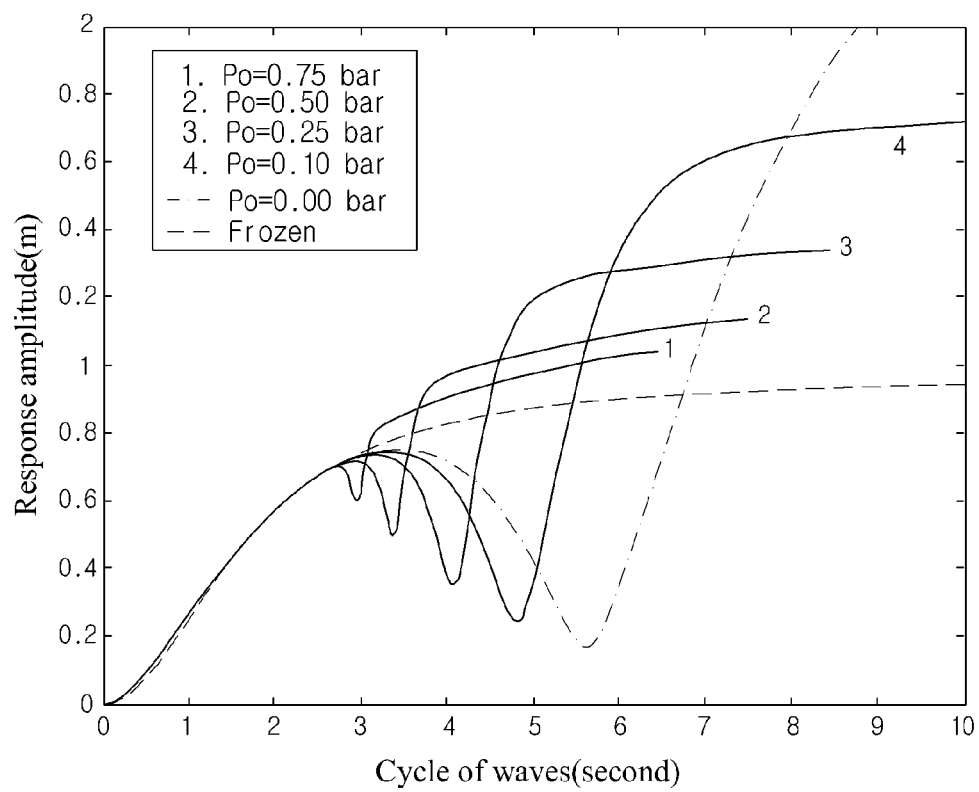

FIG. 9 is a graph illustrating control frequency response characteristics of the present invention according to the first control method.

The greater the air pressures Po of the air chambers 5a and 5b are increased in an equilibrium state, the shorter a cycle of waves in which the TLCD region is formed is. When the air pressures Po of the air chambers 5a and 5b are appropriately adjusted according to such a cycle of waves, the response of the present invention according to the first method is always greater than the response in a state of frozen waves.

Figure 10:
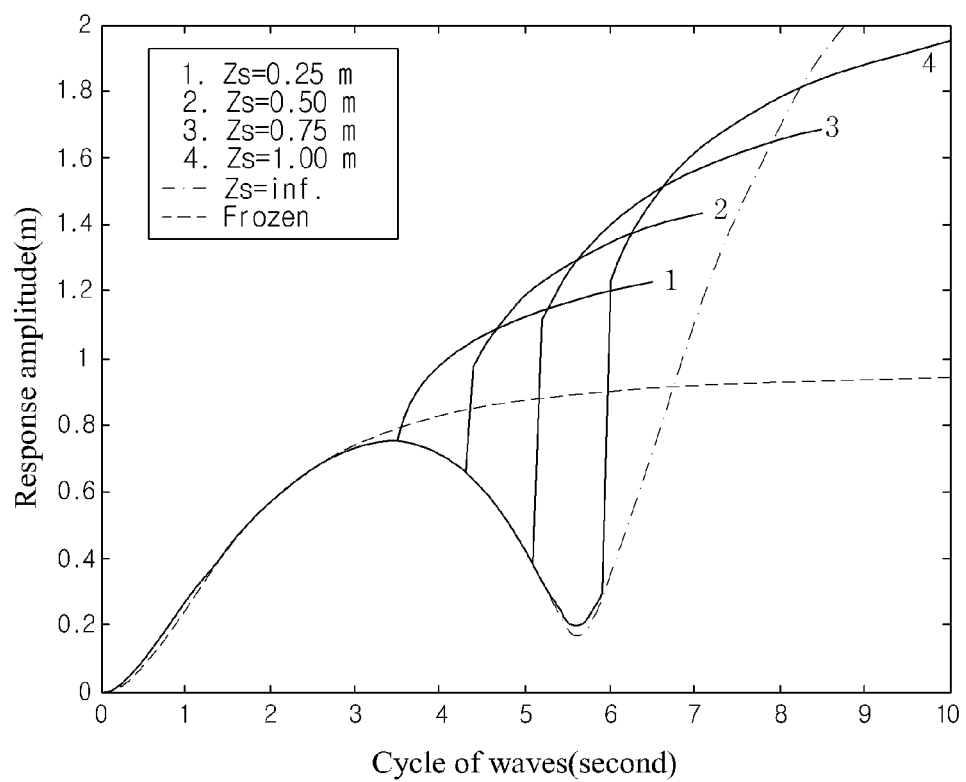

FIG. 10 is a graph illustrating control frequency response characteristics of the present invention according to the second control method.

It can be seen that the TLCD region is not shifted as in the control frequency response characteristics of the present invention according to the first control method; however, the higher the predetermined specific reference level Zs of vertical tubes 2a and 2b is, the greater amplitude of the response is in a short cycle of waves.

When the predetermined specific reference level Zs is appropriately adjusted according to a cycle of waves, therefore, the response of the present invention according to the second control method is always greater than the response in a state of frozen waves.

In the first control method of the present invention, the air pressures Po of the air chambers 5a and 5b when the floating body 118 is in an equilibrium state as shown in FIG. 6(A) are defined as control variables. In the second control method of the present invention, on the other hand, the predetermined specific reference level Zs of the vertical tubes 2a and 2b, at which the center control valve $CV_0$ is opened or closed according to the level of the internal operating liquid 11 contained in the floating body 118, is defined as a control variable.

In addition to these control variables, the coefficient of viscous friction generated from the electric generator for energy absorption in a power operation serve as a variable greatly affecting the behavior of the variable liquid column oscillator according to the present invention.

In the power operation of the present invention, therefore, the air pressures Po of the air chambers 5a and 5b to absorb maximum energy in the amplitude and cycle of waves given according to the first and second control methods and the coefficient of viscous friction, or the predetermined specific reference level Zs and the coefficient of viscous friction, are calculated. Subsequently, these control variables are scheduled according to the amplitude and cycle of waves through the controller 10 described with reference to FIG. 5.

Meanwhile, simulations of the control methods applied to the present invention reveal that, when the first control method is applied to the present invention, the present invention absorbs 1.5 to 2.6 times more energy than a conventional energy absorption type wave energy apparatus in a wave condition such as in the ocean, and, when the second control method is applied to the present invention, the present invention absorbs 1.9 to 2.2 times more energy than the conventional energy absorption type wave energy apparatus in the same wave conditions.

As apparent from the above description, it is possible for the movable object type high-frequency wave energy apparatus according to the present disclosure to produce electric power using the variable liquid column oscillator even when the height of waves is low. In addition, it is possible to prevent the movement of the floating body and to transmit electricity generated from the floating body through the submarine cable using the VECTRAN® wire instead of a conventional mooring device, thereby eliminating the necessity of an additional ocean structure.

Also, it is possible to convey the floating body to a seaside warehouse, when it is necessary to repair the apparatus or in a state of emergency such as abnormal weather, thereby achieving convenience and safety in repair. Furthermore, it is possible to operate the movable object type wave energy apparatus according to the present invention through remote monitoring and control, thereby improving operational efficiency.

Therefore, the present invention has much higher economy, safety, and operational efficiency than the conventional wave energy apparatus. In addition, the present invention has much higher function and effects than the conventional wave energy apparatus.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A movable object type high-efficiency wave energy apparatus, comprising floating bodies floating on a sea surface to convert upward and downward movements of waves generated by wind into electric energy,
    wherein each of the floating bodies includes a variable liquid column oscillator, and neighboring ones of the floating bodies are connected to each other via a coupler, wherein the coupler comprises:
        left and right bodies of the floating bodies;
        a horizontal rotary shaft and a vertical rotary shaft connected to each other via a middle hinge shaft to connect the left and right bodies to each other; and
        ram connection units configured to connect the horizontal and vertical rotary shafts with electric power converters disposed in left and right bodies for converting rotational movements of the horizontal and vertical rotary shafts into respective rectilinear movements to compress operating oil,
    wherein the electric power converters comprise:
        accumulators connected to respective ones of the ram connection units for storing the operating oil compressed by the ram connection unit;
        coolers connected to the accumulators and configured to cool the oil; and
        electric generators for converting the oil compressed and stored in the accumulators into electric power,
    wherein the electric generators of the electric power converters disposed at the left and right bodies are connected to a concrete dock installed on a sea floor via a VECTRAN ® wire, and
    wherein a submarine cable connected to the VECTRAN ® wire through the concrete dock supplies electricity to land via a power station and a power line.

2. The movable object type high-efficiency wave energy apparatus according to claim 1, wherein:
    each of the floating bodies has a hollow cylinder shape,
    a front of each of the floating bodies has a streamline shape to minimize friction with waves, and
    a connection ring to convey each of the floating bodies is disposed at a front end of each of the floating bodies.

3. The movable object type high-efficiency wave energy apparatus according to claim 1, wherein the variable liquid column oscillator comprises:
    a U-shaped tube comprising a horizontal tube and two vertical tubes;
    air chambers connected to the vertical tubes, the air chambers being isolated from each other;
    an air tube to connect the air chambers to each other; and
    control valves mounted on the air tube, wherein at least one of the control valves is selectively opened or closed to communicate the air chambers to the atmosphere to control the air pressure of the air chambers.

4. The movable object type high-efficiency wave energy apparatus according to claim 3, further comprising a controller connected to the control valves for controlling at least one of the control valves to achieve efficient energy absorption.

5. The movable object type high-efficiency wave energy apparatus according to claim 4, wherein the controller controls air pressures of the air chambers in an equilibrium state based on an amplitude and cycle of waves to improve energy absorption efficiency.

6. The movable object type high-efficiency wave energy apparatus according to claim 4, wherein the controller controls the control valves disposed between the air chambers to be opened and closed at a specific reference level of an internal operating liquid based on an amplitude and cycle of waves to improve energy absorption efficiency.

7. The movable object type high-efficiency wave energy apparatus according to claim 4, wherein, when frozen waves are generated, the controller controls air pressures of the air chambers such that a variable liquid column oscillator is operated in a tuned liquid column damper (TLCD) region to reduce an excessive load applied to the electric power converters.

8. The movable object type high-efficiency wave energy apparatus according to claim 3, wherein the U-shaped tube of the variable liquid column oscillator is filled with a predetermined amount of an internal operating liquid.

9. The movable object type high-efficiency wave energy apparatus according to claim 8, wherein the internal operating liquid is water or seawater.

10. The movable object type high-efficiency wave energy apparatus according to claim 1, wherein
    in each of the electric power converters disposed in the left and right bodies of the coupler, one of the ram connection units is connected to the corresponding accumulator to convert rotational movements of the horizontal and vertical rotary shafts rotating in a transverse direction and in a longitudinal direction of each of the floating bodies, respectively, into rectilinear movements, and
    the ram connection unit comprises a plurality of rams.

11. The movable object type high-efficiency wave energy apparatus according to claim 1, wherein
    the accumulators connected to the respective ram connection units are configured to store operating oil compressed by the respective ram connection units, and
    the electric generators are connected to the respective accumulators to convert the compressed oil, stored in the accumulators, into electric power.

12. The movable object type high-efficiency wave energy apparatus according to claim 1, further comprising a connection member for electric power transmission, connected to the VECTRAN ® wire to transmit the electric power generated by the electric generators.

13. The movable object type high-efficiency wave energy apparatus according to claim 12, wherein
    the VECTRAN ® wire includes a synthetic fiber which readily floats in water, and
    a power transmission line connected to the submarine cable is disposed in the VECTRAN ® wire.

14. The movable object type high-efficiency wave energy apparatus according to claim 12, further comprising a buoy connected to a one end of the VECTRAN ® wire.

* * * * *